United States Patent [19]

Lee

[11] Patent Number: 5,680,279
[45] Date of Patent: Oct. 21, 1997

[54] AUDIO HEAD ASSEMBLY FOR USE IN A VIDEO CASSETTE RECORDER

[75] Inventor: Chang-Ho Lee, Seoul, Rep. of Korea

[73] Assignee: Daewoo Electronics Co., Ltd, Seoul, Rep. of Korea

[21] Appl. No.: 581,018

[22] Filed: Jan. 3, 1996

[30] Foreign Application Priority Data

Mar. 29, 1995 [KR] Rep. of Korea .................. 95-5852

[51] Int. Cl.$^6$ .................................................. G11B 5/56
[52] U.S. Cl. ............................................................ 360/109
[58] Field of Search .............................. 360/109, 104, 360/106, 130.2, 130.21; 369/44.15, 44.16

[56] References Cited

U.S. PATENT DOCUMENTS

| 4,422,116 | 12/1983 | Cap | 360/109 |
| 4,589,040 | 5/1986 | Kawase | 360/109 |
| 4,774,614 | 9/1988 | Murakami et al. | 360/109 |
| 5,055,956 | 10/1991 | Kaya et al. | 360/109 |
| 5,146,377 | 9/1992 | Baheri | 360/109 |
| 5,264,979 | 11/1993 | Schandl et al. | 360/109 |
| 5,479,307 | 12/1995 | Lee | 360/109 |

FOREIGN PATENT DOCUMENTS

| 63-2115 | 1/1988 | Japan | 360/109 |
| 63-302484 | 12/1988 | Japan | |
| 2137111 | 5/1990 | Japan | 360/109 |
| 6-44542 | 2/1994 | Japan | 360/109 |

OTHER PUBLICATIONS

IBM Technical Disclosure Bulletin, "Mechanism For Adjusting Positions of Magnetic Pickups", Fournier et al, vol. 12, No. 1, Jun. 1969, p. 125.

*Primary Examiner*—Robert S. Tupper
*Assistant Examiner*—David L. Ometz
*Attorney, Agent, or Firm*—Anderson Kill & Olick P.C.

[57] ABSTRACT

An audio head assembly for use in a video cassette recorder comprises an audio head support plate provided with a tapped hole and two slots; an audio head secured on the audio head support plate; an elastic member provided with a throughhole and two slots; and bolts for fixing the audio head support plate and the elastic member to the main plate. The elastic member is attached to a bottom surface of the audio head support plate in such a way that the throughhole and the slots thereof correspond to the tapped hole and the slots of the audio head support plate. The bolts are fitted through the tapped hole and the slots of the audio head support plate, the throughhole and the slots of the elastic member, and into the threaded holes of the main plate, respectively.

4 Claims, 2 Drawing Sheets

AUDIO HEAD ASSEMBLY FOR USE IN A VIDEO CASSETTE RECORDER

FIELD OF THE INVENTION

The present invention relates to an audio head assembly for use in a video cassette recorder ("VCR"); and, more particularly, to an improved audio head assembly, with a simplified structure, capable of allowing an easy assembly operation thereof.

DESCRIPTION OF THE PRIOR ART

Generally, an audio head, which comprises an audio erasing head and an audio/control head, is installed at a desired height and inclination on a main plate in order to precisely sense a running magnetic tape. That is, the audio head is provided along a direction perpendicular to the running magnetic tape so as to facilitate its role of, e.g., maintaining the tape tension constant.

In FIG. 1, there is shown a schematic exploded perspective view of a conventional audio head assembly 100 which includes a base 20, an audio head support plate 10, an audio head 12, a triplet of springs 30, and a plurality of bolts 18.

The base 20 is provided with a triplet of threaded holes 22, a throughhole 26 and a slot 24.

The audio head support plate 10 is provided with a triplet of tapped holes 14 corresponding to the triplet of threaded holes 22 of the base 20.

The audio head 12, which comprises an audio erasing head and an audio/control head, is secured on the audio head support plate 10 using an appropriate fastening means, e.g., adhesive.

A typical assembling process of the conventional audio head assembly 100 may be as follows:

First, the audio head support plate 10 is assembled to the base 20 by using three bolts 18 which are, in turn, fitted through the triplet of threaded holes 14 thereof, the triplet of springs 30, and into the triplet of tapped holes 22 of the base 20 from above, respectively. The springs 30, therefore, resiliently support the audio head support plate 10 upward.

The base 20 is, then, fixed loosely to a main plate 40 incorporated in the VCR by using two screws 28, 29 which are fitted through the slot 24 and the throughhole 26 thereof, and into two threaded holes of the main plate 40, respectively.

Finally, the position, height and inclination of the audio head 12 is adjusted by pivoting the base 20 about the screw 29 and tightly fastening the screw 28, and by downwardly screwing and upwardly loosening the triplet of bolts 18 so that the audio head 12 is set to be perpendicular to a running magnetic tape (not shown) in the VCR.

However, since such a conventional audio head assembly 100 comprises a large number of components, it is rather difficult and cumbersome to assemble them together, resulting in an increase in the production cost thereof.

SUMMARY OF THE INVENTION

It is, therefore, a primary object of the invention to provide an audio head assembly, with a simplified structure, capable of being easily assembled together.

In accordance with one aspect of the present invention, there is provided an audio head assembly for use in a video cassette recorder having a main plate provided with at least three threaded holes, which comprises: an audio head support plate provided with at least one tapped hole and at least two slots; an audio head including an audio erasing head and an audio/control head, the audio head secured on the audio head support plate; an elastic member provided with at least one throughhole and at least two slots, the elastic member attached to a bottom surface of the audio head support plate in such a way that the throughhole and the slots thereof correspond to the tapped hole and the slots of the audio head support plate, respectively; and means for fixing the audio head support plate and the elastic member to the main plate, the fixing means being fitted through the tapped hole and the slots of the audio head support plate, the throughhole and the slots of the elastic member, and into the threaded holes of the main plate, respectively.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
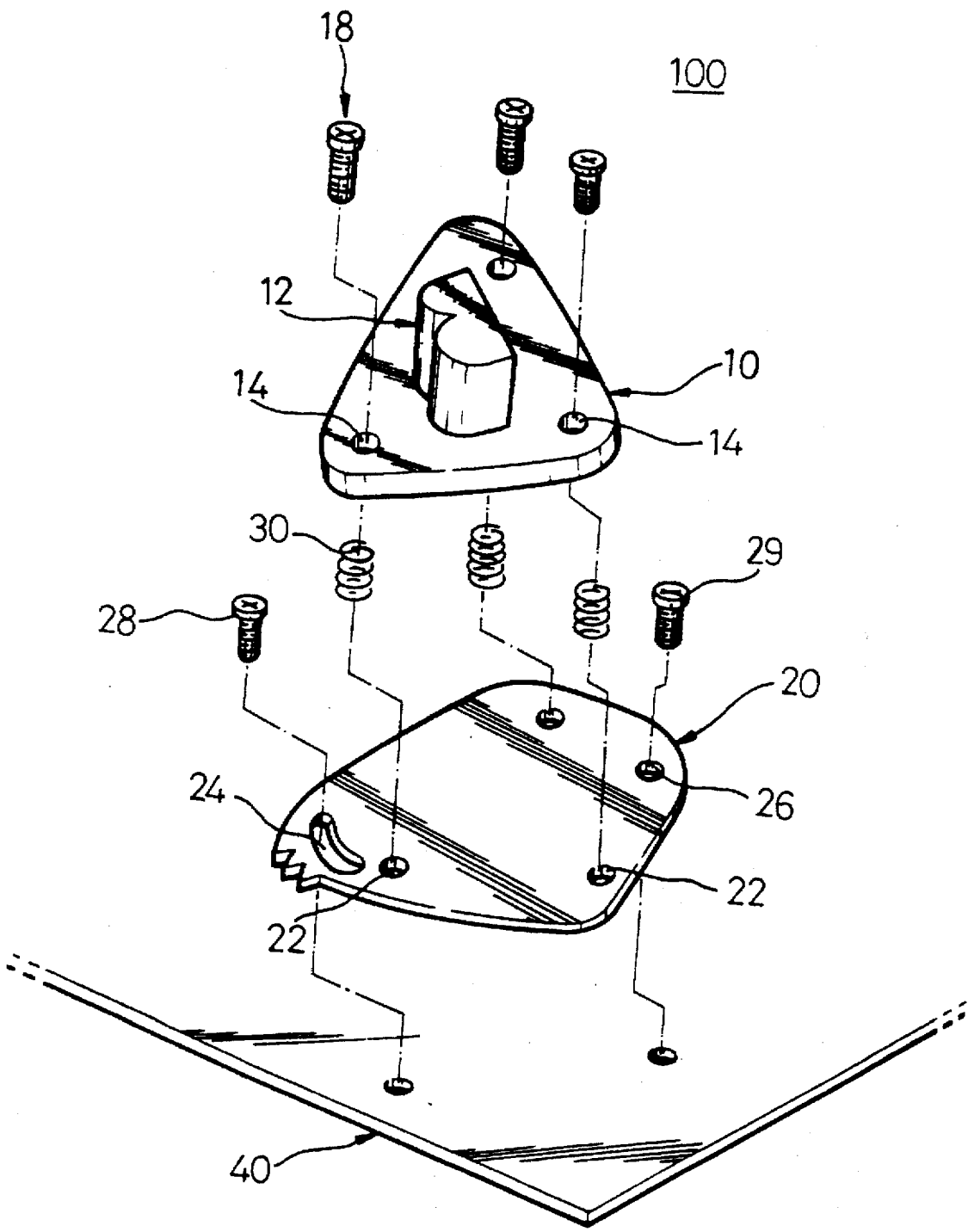
FIG. 1 shows a schematic exploded perspective view of a conventional audio head assembly.
Figure 2:
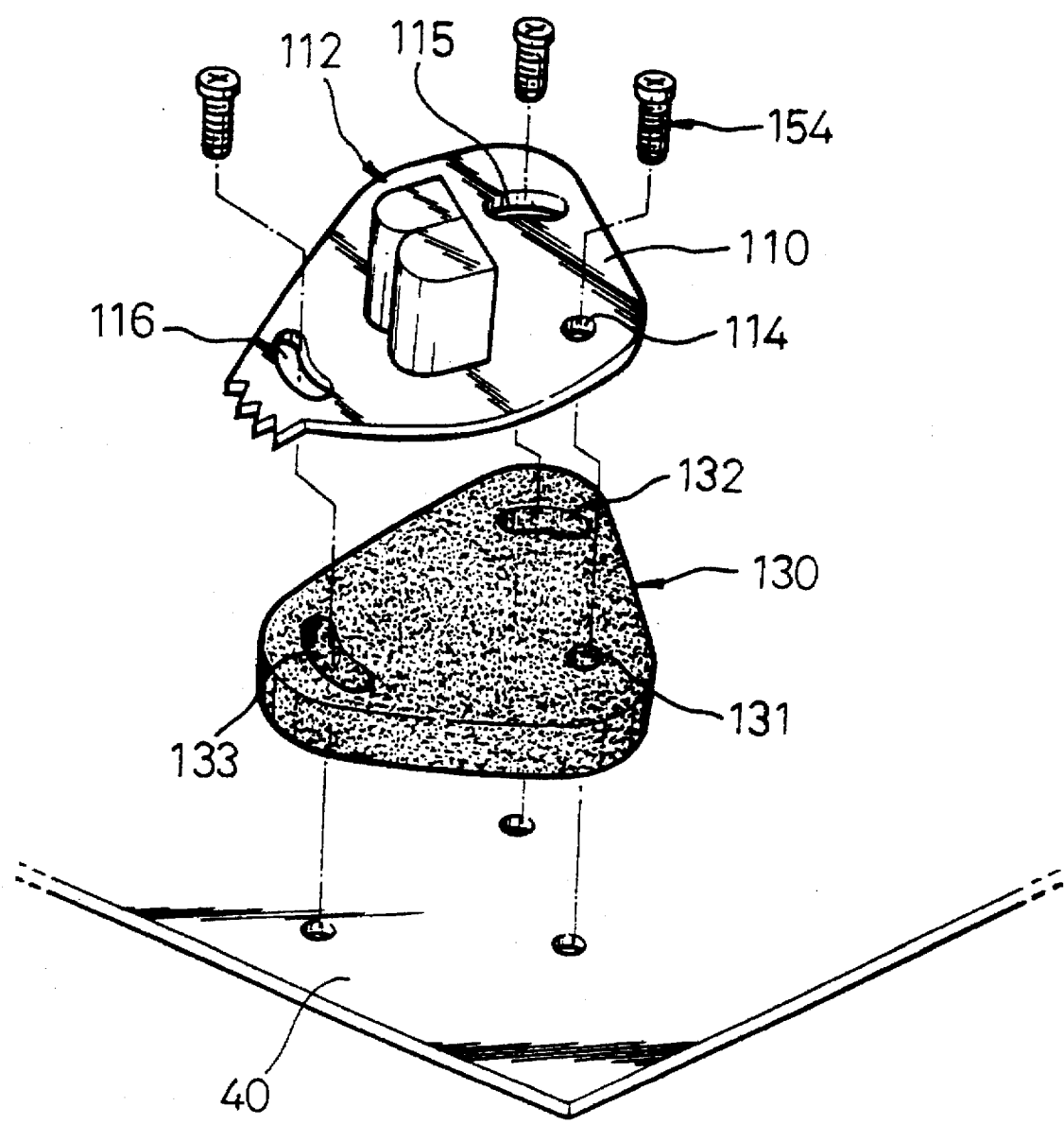
FIG. 2 represents a schematic exploded perspective view of an audio head assembly in accordance with the present invention.

There is shown in FIG. 2 a schematic exploded perspective view of a preferred embodiment of the inventive audio head assembly 200.

The audio head assembly 200 of the present invention comprises an audio head support plate 110, an audio head 112, an elastic member 130, and a triplet of bolts 154.

The audio head support plate 110 is provided with a tapped hole 114 and a first and a second slots 115, 116.

The audio head 112 includes an audio erasing head and an audio/control head and is secured on the audio head support plate 110 using an appropriate fastening means, e.g., adhesive.

The elastic member 130, which is intended to resiliently support the audio head support plate 110, is provided with a throughhole 131 and a third and a fourth slots 132, 133 and has a thickness larger than a desired height at which the audio head is to be installed. The elastic member 130 is attached to a bottom surface of the audio head support plate 110 in such a way that the throughhole 131, the third and the fourth slots 132, 133 correspond to the tapped hole 114, the first and the second slots 115, 116 of the audio head support plate 110, respectively.

It is preferable that the elastic member 130 be made of a rubber having a high elasticity and low hardness.

The audio head support plate 110 and the elastic member 130 are, then, fixed to a main plate 40 incorporated in the VCR by using the triplet of bolts 154 which are, in turn, fitted through the tapped hole 114, the first and the second slots 115, 116, the throughhole 131, the third and the forth slots 132, 133, and into a triplet of threaded holes of the main plate 40 from above, respectively.

The position, height and inclination of the audio head 112 may be adjusted by loosening or tightening the bolts 154, pivoting the audio head support plate 110 together with the elastic member 130 about one specific bolt 154 which is fitted through the tapped hole 114 and the throughhole 131, and by downwardly fastening and upwardly loosening each of the bolts 154 so that the audio head 112 is set to be perpendicular to a running magnetic tape (not shown) in the VCR.

In such an audio head assembly 200 of the present invention, since the number of the components incorporated therein is significantly reduced and because of their structural designs, it is easier to assemble them together, resulting in a reduction in the production cost thereof.

Although the invention has been shown and described with respect to the preferred embodiments, it will be understood by those skilled in the art that various changes and modifications may be made without departing from the spirit and scope of the invention as defined in the following claims.

What is claimed is:

1. An audio head assembly for use in a video cassette recorder having a main plate provided with at least three threaded holes, which comprises:

an audio head support plate provided with at least one tapped hole and at least two slots;

an audio head including an audio erasing head and an audio/control head, the audio head secured on the audio head support plate;

an elastic member provided with at least one throughhole and at least two slots, the elastic member attached to a bottom surface of the audio head support plate in such a way that the throughhole and the slots thereof correspond to the tapped hole and the slots of the audio head support plate, respectively; and means for fixing the audio head support plate and the elastic member to the main plate, the fixing means fitted through the tapped hole and the slots of the audio head support plate, the throughhole and the slots of the elastic member, and into the threaded holes of the main plate, respectively.

2. The audio head assembly of claim 1, wherein the elastic member is made of rubber.

3. The audio head assembly of claim 1, wherein the fixing means are bolts.

4. A video cassette recorder comprising the audio head assembly as recited in claim 1.

* * * * *